March 4, 1969  R. WICK  3,430,545
PHOTOGRAPHIC CAMERA WITH FLASH UNIT
Filed Nov. 8, 1966  Sheet 1 of 2

INVENTOR.
RICHARD WICK
BY
Michael S. Striker

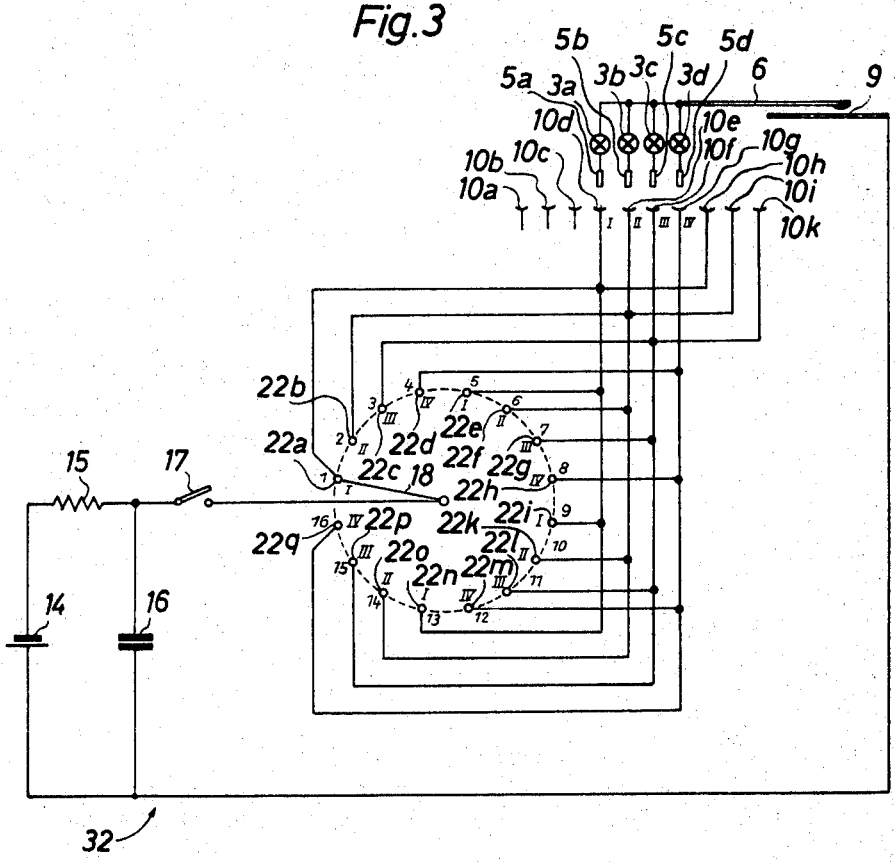

United States Patent Office 3,430,545
Patented Mar. 4, 1969

3,430,545
PHOTOGRAPHIC CAMERA WITH FLASH UNIT
Richard Wick, Grunwald, near Munich, Germany, assignor to Agfa-Gevaert Aktiengesellschaft, Leverkusen, Germany
Filed Nov. 8, 1966, Ser. No. 592,865
Claims priority, application Germany, Nov. 11, 1965, A 50,758
U.S. Cl. 95—11                                10 Claims
Int. Cl. G03b 19/04

The present invention relates to photographic cameras with built-in or detachable flash units, and more particularly to improvements in cameras whose flash units utilize strip-shaped multiple flash bulb holders.

In many recent types of photographic cameras, the film transporting mechanism is utilized to connect successive flash bulbs of a strip-shaped multiple flash bulb holder in the flash circuit so that the circuit is completed during the next-following exposure. A drawback of such cameras is that the flash bulb which is fired first when a holder is attached to the flash unit after the user has already taken a few pictures with the film in the camera is not always the first or foremost unfired flash bulb in the holder. Otherwise stated, and assuming that the holder contains four flash bulbs and is attached to the flash unit upon completed exposure of seven of a total of sixteen film frames, the user is not at all sure that the first flash bulb which will be fired during the next exposure is the leftmost or the rightmost unfired flash bulb of the freshly inserted holder. Such skipping of flash bulbs is undesirable because the user is not sure that he can make four successive exposures with flash without necessitating replacement or resetting of the holder.

The situation is similar if the user inserts a partially spent flash bulb holder. It can happen that the holder is inserted in such position that the next exposure will not result in firing of a flash bulb because the bulb which is connected in the flash circuit has been fired before. This can result in making of unsatisfactory exposures whenever the prevailing conditions are such that the taking of a picture necessitates the firing of a flash bulb.

It is an object of my present invention to provide a photographic camera with a built-in or detachable flash unit for use with strip-shaped multiple flash bulb holders and to construct the camera and the flash unit in such a way that the user can invariable insert a fresh or a partially expended strip-shaped multiple flash bulb holder in a position in which the unfired flash bulbs will be fired in a predetermined sequence, always starting at the same end of the holder.

Another object of the invention is to provide a camera of the just outlined characteristics wherein such serial firing of flash bulbs is insured regardless of whether a fresh or a partially expended strip-shaped multiple flash bulb holder is inserted prior to making the first exposure with the film in the camera or after the user has completed one or more exposures.

A further object of the invention is to provide a camera with a flash unit which embodies a novel flash circuit.

An additional object of the invention is to provide the camera and the flash unit with a set of very simple and readily comprehensible indicia and symbols which enable the user to insert a fresh or a partly expended strip-shaped multiple flash bulb holder in a position in which the flash bulbs of the holder are ready for firing in a predetermined optimum sequence.

Briefly stated, my invention is embodied in a photographic camera for use with film having $m \cdot n$ frames wherein $m$ and $n$ are whole numbers greater than one. The camera comprises a frame counter having a sequence of $m \cdot n$ indicia representing the serial numbers of successive film frames and a sequence of $m$ groups of $n$ successive symbols each associated with one of the indicia, means (e.g. an element of the film transporting mechanism or an element which receives motion from the shutter release trigger) for moving the frame counter on completion of exposures to place successive indicia into a predetermined position indicating the serial number of the first unexposed film frame, and a built-in or detachable flash unit for use with strip-shaped multiple flash bulb holders having $n$ flash bulbs and first and second electric terminals for each flash bulb. The flash unit comprises a flash circuit including at least $2n-1$ (but preferably $3n-2$) first and second electrodes each engageable by a corresponding terminal and comprising a group of $n$ successive first electrodes, $n$ reference symbols provided on the flash unit and each adjacent to one of such group of successive first electrodes, current supplying means preferably including a battery and a capacitor and having two poles with one thereof connected to the second electrodes, a first contact connected with the other pole of the current supplying means and movable with or in synchronism with the frame counter, and a sequence of $m \cdot n$ second contacts each connected with at least one first electrode. The second contacts are engaged seriatim by the first contact in response to successive movements of the frame counter and the electrical connections between the first electrodes and the second contacts are such that successive unfired flash bulbs of a holder which is attached to the flash unit are automatically connected in the flash circuit if the holder is attached in such a way that the first terminal of the first unfired flash bulb engages with the first electrode identified by the same reference symbol as the one associated with the indicium assuming the aforementioned predetermined position.

The novel features which are considered as characteristic of the invention are set forth in particular in the appended claims. The improved camera itself, however, both as to its construction and its mode of operation, together with additional features and advantages thereof, will be best understood upon perusal of the following detailed description of a specific embodiment with reference to the accompanying drawings, in which:

FIG. 3 is a diagram of the flash circuit.

Figure 1:
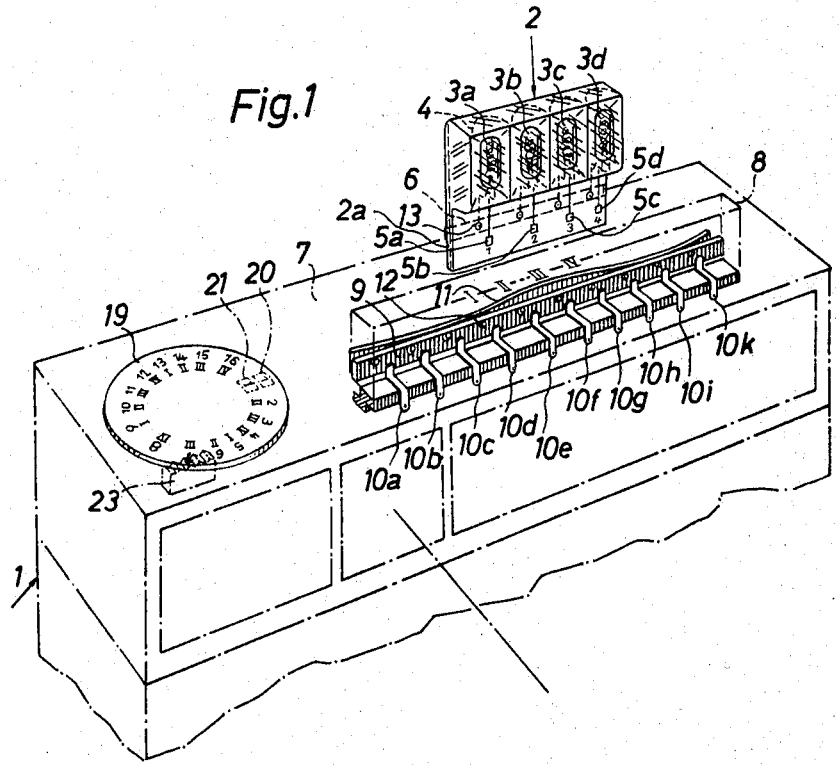
FIG. 1 is a fragmentary perspective view of a still camera with built-in flash unit which embodies the present invention, a strip-shaped multiple flash bulb holder being shown in a position it assumes prior to actual connection with the flash unit.
Figure 2:
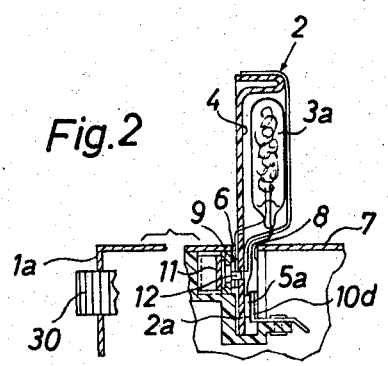
FIG. 2 is a fragmentary transverse vertical section through the camera, with the flash bulb holder connected to the flash unit.

Referring to the drawings in detail, and first to FIGS. 1 and 2, there is shown a still camera with a built-in flash unit for use with strip-shaped multiple flash bulb holders 2 of the type containing a series of $n=4$ flash bulbs 3a, 3b, 3c, 3d. The camera comprises a housing 1 which accommodates a conventional film transporting mechanism adapted to advance the film by increments corresponding to the length of a film frame. The film transporting mechanism includes an actuating member here shown as a milled wheel 30 a portion of which extends outwardly through a cutout in the rear wall 1a of the housing 1. In the illustrated embodiment, the camera is assumed to be constructed for use with films having $m \cdot n = 16$ frames, i.e., the number of frames is a whole multiple of the number $n$ of flash bulbs 3a–3d in a holder 2. Each flash bulb is located in front of a reflector 4 and each of these flash bulbs has two terminals. The first terminals 5a–5d of the flash bulbs 3a–3d are provided at the front side of the holder 2 and are insulated from each other. The second terminals of the flash bulbs together form an elongated single terminal 6 provided at the rear side of the holder 2.

The top wall 7 of the housing 1 has an elongated slot 8 which can receive the lower portion 2a of the holder 2. In the zone below the slot 8, the housing 1 accommodates an elongated second electrode 9 which is engaged by the terminal 6 of a properly inserted holder 2 regardless of the position of such holder lengthwise of the slot 8. It will be seen that the slot 8 is longer than the holder 2. The housing 1 further accommodates a row of $3n-2=10$ separate first electrodes 10a–10k four of which will be engaged by the terminals 5a–5d of the holder 2 when the lower portion 2a enters the slot 8. The electrode 9 constitutes or replaces a sequence of $3n-2=10$ discrete second electrodes and is biased from behind by an elongated leaf spring 11 (see FIG. 2). This electrode 9 is preferably provided with a row of forwardly extending projections 12 which can snap into complementary recesses 13 (FIG. 1) provided in the rear side of the lower portion 2a so that the holder 2 is held against unintentional displacement with reference to the housing 1. The projections 12 and recesses 13 constitute but one form of detent means which can be employed to provide a releasable but sufficiently firm connection between the holder 2 and the electrodes 9, 10a–10k of the built-in flash unit. When the circuit of a flash bulb is completed, current flows through the electrode 9, terminal 6, the filament of the respective flash bulb, one of the terminals 5a–5d and one of the first electrodes 10d–10k.

As shown in FIG. 3, the flash circuit of the built-in flash unit further comprises a current supplying unit 32 including a source 14 of electrical energy, preferably a battery, a capacitor 16 connected in parallel with the battery, a charging resistor 15, and a synchronizing switch 17 which is closed in response to depresssion of a shutter release trigger 23 (FIG. 1). One pole of the current supplying unit 32 is connected with the electrode 9 and the other pole is connected to a movable contact 18. The switch 17 is connected between the other pole and one plate of the capacitor 16. The movable contact 18 can be placed into current-conducting engagement with a series of circularly distributed fixed contacts 22a–22q whose number $(m \cdot n)$ equals the total number of film frames.

The movable contact 18 is connected with a disk-shaped film frame counter 19 which is indexed about a vertical axis in response to successive manipulations of the film transporting mechanism (actuating member 30). The operative connection between the member 30 and frame counter 19 is of conventional design and forms no part of the present invention. It is equally within the purview of my invention to rotate the frame counter 19 in response to depression of the trigger 23. All that counts is to make sure that the angular position of the frame counter 19 will indicate the number of exposed and/or unexposed film frames.

The frame counter 19 carries a sequence of $m \cdot n$ indicia in the form of numbers 1 to 16, and one of these indicia is observable through a window 20 provided in the top wall 7 of the housing 1. It is to be noted that the frame counter 19 is mounted in the interior of the housing 1 just below the top wall 7. If the counter 19 is installed outside of the housing 1, the latter is provided with an index or marker replacing the window 20 and registering with that one of the indicia 1–16 which indicates the serial number of the first unexposed film frame.

The frame counter 19 further carries $m$ groups of $n$ symbols I to IV each adjacent to one of the indicia 1–16. It will be seen that the indicia 1, 5, 9, 13 are adjacent to symbols I, that the indicia 2, 6, 10, 14 are adjacent to symbols II, and so forth. One of the sixteen symbols is observable through a second window 21 in the top wall 7.

The fixed contacts 22a, 22e, 22i, 22r; 22b, 22f, 22k, 22o; 22c, 22g, 22l, 22p; 22d, 22h, 22m, 22q are respectively connected with the first electrodes 10d; 10e; 10f; 10g. The first electrodes 10d, 10e, 10f are further electrically connected with the first electrodes 10h, 10i, 10k, respectively. The first electrodes 10a, 10b, 10c are "blind" and can be omitted. All that is necessary is to provide a slot 8 of such length that the first terminal 5d of the last flash bulb 3d can be connected with the first electrode 10d. In the illustrated embodiment, the minimum number of first electrodes is $2n-1$ which includes the electrodes 10d–10k, and the actual number of such first electrodes is $3n-2$ of which $2n-1$ (10d–10k) can be connected with the remaining electrical components of the flash circuit, namely, with selected fixed contacts 22a–22q. The four median or central electrodes 10d, 10e, 10f, 10g are respectively denoted by a group of $n$ reference symbols I, II, III and IV.

If the camera contains a fresh film having $m \cdot n = 16$ unexposed frames, the frame counter 19 will assume the position shown in FIG. 3 and the user will see the indicium 1 through the window 20. The window 21 will expose the symbol I which informs the user that the first flash bulb 3a of a fresh holder 2 must be inserted so that the terminal 5a engages the first electrode 10d (the latter being identified by the reference symbol I, i.e., by the same symbol as the one which can be observed through the window 21). During the next four exposures, the moving contact 18 will respectively engage the contacts 22a, 22b, 22c, 22d to thus cause firing of the bulbs 3a, 3b, 3c, 3d. This will be understood by referring to the flash circuit of FIG. 3 which shows that the contacts 22a–22d are electrically connected with the electrodes 10d–10h. That indicium on the frame counter 19 which registers with the window 20 can be said to have assumed a predetermined position which is indicative of the first unexposed film frame.

It is now assumed that the user wishes to make exposures with flash after having completed two exposures in daylight or in a light produced by the flash bulbs of a holder which has been detached from the flash unit. The window 20 registers with the indicium 3 on the frame counter 19 and the window 21 registers with a symbol III which in turn registers with the indicium 3. This instructs the user to insert a fresh flash bulb holder 2 in such a way that the terminal 5a of the leftmost flash bulb 3a engages the first electrode 10f which latter is identified by the reference symbol III. During the next four exposures, the flash unit will fire the bulbs 3a, 3b, 3c, 3d because the contact 18 will engage the fixed contacts 22c, 22d, 22e, 22f which are respectively connected with the terminals 10f, 10g, 10h, 10i. Of course, when the terminal 5a engages the electrode 10f, the terminals 5b, 5c, 5d respectively engage the electrodes 10g, 10h, 10i.

If the user has completed seven exposures and wishes to insert a partially expended holder 2 with unfired bulbs 3c and 3d, the terminal 5c of the first unfired bulb 3c must be placed in contact with the electrode 10h which is denoted by the reference symbol IV. This will be readily understood because the window 20 then registers with the indicium 8 (next-following unexposed film frame) and the window 21 registers with that symbol IV which is associated with the indicium 8.

It will be seen that the flash unit of my invention can invariably fire the bulbs of a strip-shaped holder 2 in a predetermined sequence, regardless of the number of exposures which were completed prior to attachment of a holder and regardless of the number of fired flash bulbs in the holder which is attached to the camera. It is also clear that the invention can be embodied in other types of cameras which use films having more or fewer than sixteen frames and whose flash units can take holders having more or fewer than four flash bulbs, as long as the number of film frames is a whole multiple of the number of flash bulbs.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a camera for use with film having $m \cdot n$ frames wherein $m$ and $n$ are whole numbers greater than one, a frame counter having a sequence of $m \cdot n$ indicia representing successive film frames and a sequence of $m$ groups of $n$ successive symbols each associated with one of said indicia; means for moving said counter on completion of exposures to place successive indicia into a predetermined position indicating the serial number of the first unexposed frame; and a flash unit for use with strip-shaped multiple flash bulb holders having $n$ flash bulbs and first and second terminals for each bulb, said unit comprising a flash circuit including at least $2n-1$ first and second electrodes each engageable by a corresponding terminal, said first electrodes including a group of $n$ successive electrodes, $n$ reference symbols provided on said unit and each adjacent to one of said group of successive first electrodes, current supplying means having two poles with one thereof connected to said second electrodes, a first contact connected with the other pole and movable in synchronism with said counter, and a sequence of $m \cdot n$ second contacts each connected with at least one first electrode, said second contacts being engaged seriatim by said first contact in response to successive movements of said counter to thereby connect into said circuit successive unfired flash bulbs of a holder which is attached to said unit in such a way that the first terminal of the first unfired flash bulb engages that first electrode which is identified by the same reference symbol as the one associated with the indicium assuming said predetermined position.

2. A structure as defined in claim 1, wherein the 1st ... $n-1$st remaining first electrodes are electrically connected with the 1st ... $n-1$st first electrodes of said group.

3. A structure as defined in claim 2, wherein said counter is rotatable about a fixed axis and said first contact is rotatable with said counter, said second contacts forming a circle about said fixed axis.

4. A structure as defined in claim 2, wherein said second electrodes are electrically connected to each other.

5. A structure as defined in claim 2, wherein said flash unit comprises $n-1$ additional first and second electrodes and wherein such additional electrodes are insulated from said first-mentioned electrodes and from said contacts, said group of first electrodes being disposed centrally between the remaining first electrodes.

6. A structure as defined in claim 2, wherein the 1st ... $n$th first electrodes of said group are respectively connected with the 1st ... $(m-1)n+1$st; ... $n$th ... $m \cdot n$th second contacts.

7. A structure as defined in claim 6, wherein said indicia are constituted by a first type of numbers and wherein said symbols and reference symbols are constituted by a second type of numbers.

8. A structure as defined in claim 6, wherein said current supplying means comprises a source of electrical energy, capacitor means connected in parallel with said source, and synchronizing switch means connected between one plate of said capacitor means and said one pole.

9. A structure as defined in claim 6, further comprising a housing having an elongated slot dimensioned to permit introduction of terminals on a multiple flash bulb holder, said electrodes being provided in the interior of said housing.

10. In a photographic camera for use with film having $m \cdot n$ frames wherein $m$ and $n$ are whole numbers greater than one and with a built-in or detachable flash unit for use with strip-shaped multiple flash bulb holders having a series of $n$ flash bulbs, in combination, a series of $3n-2$ electrode means each connectable with one of the flash bulbs in a holder, a series of $2n-1$ connections for an equal number of said electrode means, the centrally located group of $n$ successive electrode means being identified by reference symbols and being connectable seriatim into the flash circuit in response to successive manipulations of the film transporting or shutter release means; and frame counter means having a sequence of indicia indicating the serial number of successive film frames and $m$ groups of $n$ symbols each associated with one of said indicia.

References Cited

UNITED STATES PATENTS

| | | | |
|---|---|---|---|
| 2,839,667 | 6/1958 | Cannella | 240—1.3 |
| 3,064,457 | 11/1962 | Vanden Boom et al. | 240—1.3 X |
| 3,238,749 | 3/1966 | Reiber et al. | 95—11.5 X |
| 3,267,272 | 8/1966 | Fischer | 240—1.3 |
| 3,380,357 | 4/1968 | Harvey | 95—11.5 |

NORTON ANSHER, *Primary Examiner.*

C. E. SMITH, *Assistant Examiner.*

U.S. Cl. X.R.

240—1.3